(No Model.)
W. L. SILVEY.
PROCESS OF MAKING SECONDARY BATTERY PLATES.
No. 523,689. Patented July 31, 1894.
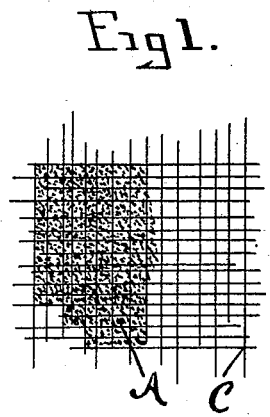
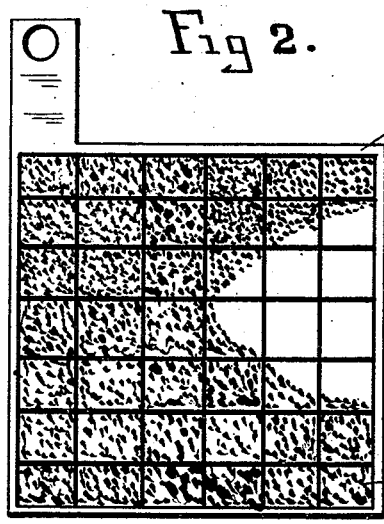
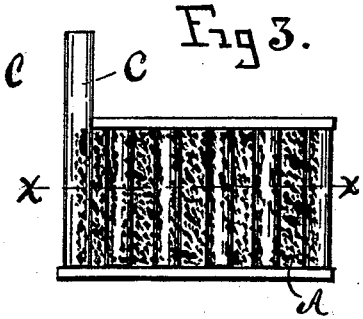
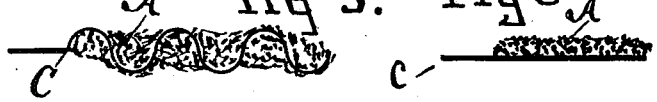
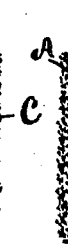
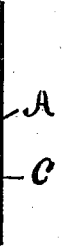
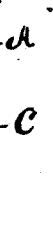
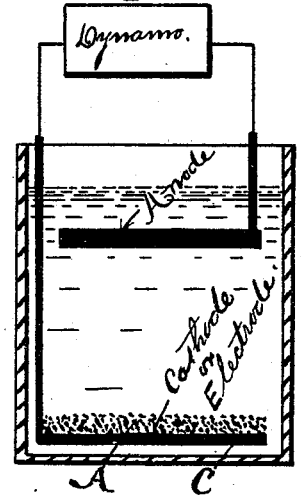
WITNESSES
N. Emmons
E. H. Hooven
INVENTOR
William L. Silvey

UNITED STATES PATENT OFFICE.

WILLIAM L. SILVEY, OF DAYTON, OHIO.

PROCESS OF MAKING SECONDARY-BATTERY PLATES.

SPECIFICATION forming part of Letters Patent No. 523,689, dated July 31, 1894.

Application filed September 22, 1892. Serial No. 446,543. (No specimens.)

*To all whom it may concern:*

Be it known that I, WILLIAM L. SILVEY, a citizen of the United States, and a resident of Dayton, in the county of Montgomery and State of Ohio, have invented certain new and useful Improvements in Secondary Batteries, of which the following is a specification.

My invention relates to a new and useful process of making secondary battery plates.

It was proposed by Gaston Planté to make a secondary battery by immersing plates of lead in a solution of sulphuric acid and water, and subjecting them to the disintegrating action of electricity, the electrodes being repeatedly subject to the action of the electric current in a reverse direction whereby the plates were gradually disintegrated, they being alternately converted into higher and lower oxides of lead by the reversals of the charging current. This process has been subsequently improved by Planté and the time of preparing the plates so as to retain a charge of electricity has been shortened from several months to a few weeks by subjecting the plates to a preliminary pickling in a very diluted solution of nitric acid and water, in which the fibers of the lead plates are broken down but not dissolved to any extent.

The Planté process of preparing battery plates is so expensive as to make the cost of production of a salable battery almost impossible and many investigators have sought to produce an absorption coating on the lead plates or electrodes without the necessity of prolonging the operation more than thirty to fifty hours. These results have been arrived at by taking peroxide of lead, monoxide of lead and minium and ramming it into holes, pressing it onto a conducting plate or in the form of a paint or paste applying it mechanically and primarily before charging by a current. The results obtained are not altogether satisfactory as all oxides of lead produced by calcination have a great many impurities and are therefore not satisfactory.

In my investigations I have found that all oxides of lead the products of igneous fusion are not sufficient conductors of electricity to be practical, as the electrodes of a secondary battery, unless they are first associated with electric conductors, which electric conductors are preferably embedded in the mass of oxide of lead, which in a sense becomes the active material for the battery plate by absorbing oxygen from the electrolyte into the positive plate and hydrogen into the negative plate the same as the electrically produced and reduced oxide in the well known Planté cell. The cost of the Planté type of secondary battery in the time of production and labor consumed being almost prohibitory so is active material if the lead has to be produced by the igneous process, the products of which absorb large quantities of oxygen from the air, as well as carbonic acid gas. This oxide of lead contains large quantities of impurities which must be eliminated in a second step by associating it with suitable electric conductors, and charged or formed by an electric current, (as the process has been called,) by which the impurities in the metallic oxide are partially driven out. The oxygen or positive plate during this forming process absorbs more oxygen and the negative plate has its oxygen nearly all driven out absorbing hydrogen and returning to a spongy metallic state. Thus it will be seen that a secondary battery element having a mechanically applied oxide of lead is not only expensive to prepare, but after being prepared must be subjected to a long tedious operation for reconverting the oxide back into metallic lead, which alone absorbs hydrogen the oxide being unsuitable as a hydrogen absorbing element.

By my process the lead for both the positive and negative plates during the preliminary process is only changed into spongy lead by electrolytic action, the process being entirely progressive in its character, and therefore more satisfactory than when a plate is covered with a material which has been produced by the calcination process as is employed in producing electrodes having red lead and litharge and by the Planté process.

Referring to the accompanying drawings which are made a part hereof in which similar letters refer to similar parts throughout, Figures 1 to 15 inclusive show a number of forms of battery electrodes which may be made according to my process although there are many other forms which may be used which I have not shown, as my invention relates broadly to a battery plate having a spongy lead or lead alloy produced and deposited by electrolytic action as fully set out in the following description. Fig. 16 shows one way of carrying out my improved process of making battery plates, elements or electrodes.

In carrying my invention into effect I first procure a suitable tank or containing vessel, capable of holding a liquid, into which I pour a quantity of water, *aqua distillata* being preferred. Into the water I now admix a quantity of a salt of potassium or potash, the quality known as refined concentrated lye being preferred although in case where this is not readily procurable pearl ash or other potassium salts may be used or even lye, produced by leaching wood ashes with water, which however will be found to contain some coloring matter. Into this solution I now admix a solution of vinegar or acetic acid, for the purpose of producing and depositing spongy lead onto a suitable battery plate which I have found by experiment should not contain less than twenty grains of solid acetate to the pound, a larger quantity making the solution stronger and therefore more vigorous.

Of course other chemicals may be included in the mixture but will not be of any benefit so far as utility is concerned and therefore I only describe the very fewest ingredients, but in so doing I do not confine myself to potash and acetic acid solution alone, as my invention broadly covers a solution containing potash and acetic acid.

The potash and acetic solution having been made I now immerse into it suitable anodes of lead or lead alloy and connect them by a wire with one pole of a suitable electric generator or dynamo electric machine. For a cathode I connect a suitable electric conductor which may be of any suitable configuration (as for instance those shown in my drawings) which I afterward use as the electrodes of my battery. The anodes may be suspended in the bath as shown in Fig. 16 and the cathodes or future battery plates or electrodes may be laid (or supported) in this solution, and being connected with an electric generator the anodes will be rapidly broken down being deposited on the cathode, forming a spongy mass of porous lead. This porous lead during its deposition absorbs large quantities of hydrogen and thereby becomes the hydrogen or negative element of the future battery. This spongy deposit is associated with suitable electric conductors which may be of rolled or cast lead or lead alloy or of any other suitable conducting material, as for instance carbon, gold or platinum. The battery plates or electrodes having been prepared with an absorbent coating of spongy lead, are now removed from this solution from which they are entirely separated by washing in water, and being assembled in a suitable number to constitute a battery are now immersed in a solution of sulphuric acid and water and charged in the usual manner for forming secondary battery elements. During this preliminary charging the spongy lead on the negative electrode becomes surcharged with hydrogen and the positive electrode is rapidly converted into an oxide of lead of the higher grade known as peroxide of lead.

Thus it is, that in a very short time, a commercially satisfactory battery is formed much more satisfactory than either batteries of the old Planté type or of the more recent cells having an active material mechanically applied as red lead or litharge.

Having fully described the essential elements of my invention, that which I claim as new, and wish to secure by Letters Patent in the United States, is embodied in the following claim:

The process of making battery electrodes which consists in immersing anodes and cathodes in a solution containing a combination of acetic acid and potassium, subjecting the anodes and cathodes to the action of an electric current while in this solution whereby the anode is oxidized and deposited upon the cathode in a metallic state, then removing the cathodes from the depositing bath and compacting the deposit and then washing them in water and then placing them into a solution of sulphuric acid and water and charging them with an electric current whereby positive electrodes are produced.

In testimony whereof I have set my hand in the presence of two subscribing witnesses.

WILLIAM L. SILVEY.

Witnesses:
 C. U. RAYMOND,
 J. KIRBY, Jr.